United States Patent [19]

Tsuchihashi et al.

[11] Patent Number: 4,661,825

[45] Date of Patent: Apr. 28, 1987

[54] IMAGE RECORDING APPARATUS WITH THERMAL HEAD

[75] Inventors: Hidehisa Tsuchihashi, Kawasaki; Kaoru Naito, Yokohama, both of Japan

[73] Assignee: Nippon Kogaku K. K., Tokyo, Japan

[21] Appl. No.: 752,514

[22] Filed: Jul. 8, 1985

[30] Foreign Application Priority Data

Jul. 19, 1984 [JP] Japan ................................ 59-150055

[51] Int. Cl.[4] ................................ G01D 15/10

[52] U.S. Cl. ................................ 346/76 PH; 400/120

[58] Field of Search ................................ 346/76 PH, 75; 400/119-124; 219/216 PH

[56] References Cited

U.S. PATENT DOCUMENTS 4,272,771 6/1981 Furukama ................................ 346/75

4,531,133 7/1985 Ling ................................ 346/76 PH

*Primary Examiner*—Arthur G. Evans

*Attorney, Agent, or Firm*—Shapiro and Shapiro

[57] ABSTRACT

An image recording apparatus provided with a thermal head, records a two-dimensional image on heat-sensitive recording paper by controlling ON times of heating elements dots. The heating elements dots are divided into a plurality of blocks which are time-divisionally driven to print one-line pixels without white lines.

12 Claims, 23 Drawing Figures

IMAGE RECORDING APPARATUS WITH THERMAL HEAD

BACKGROUND OF THE INVENTION

1. Field of the Invention

The present invention relates to an apparatus for recording a two-dimensional image on heat-sensitive recording paper by controlling ON times of heating element dots of a thermal head.

2. Description of the Prior Art

Several techniques have been extensively studied to reproduce hard copy images such as photographs from electrical image signals derived from television cameras, video cameras, video disks and electronic still cameras. Among these, a typical example is a heat-sensitive image recording technique. According to this technique, a line thermal head having heating element dots (corresponding to one line) aligned in a horizontal direction is shifted on heat-sensitive recording paper (including heat-sensitive color development paper and a laminate of an imaging sheet and a thermal transfer ink sheet). Only predetermined heating element dots are energized and heated in accordance with input image signals, and pixels for one horizontal line are printed on the recording paper. The pixels in units of horizontal lines are sequentially printed to obtain a single two-dimensional image.

In this case, the number of heating element dots corresponding to one-line pixels is determined by an image size. For example, as many as 1280 dots are used for one-line pixels. However, when such a large number of dots is used, a maximum current flow for energizing all the dots is increased. As a result, a high power source is required.

In order to solve the above problem, a conventional system is proposed wherein a plurality of heating element dots are divided into, for example, two blocks which are then time-divisionally driven. According to this system, although print time for one-line pixels is doubled, a maximum current can be decreased to ½ or less.

A temperature distribution of one heating element during heating is illustrated by a curve having a peak at the center thereof, as shown in FIG. 1. Assuming that all the dots of each block are heated, a temperature of a boundary between an energized block $B_n$ (i.e., hatched dot regions) and a nonenergized block $B_{n+1}$ (i.e., nonhatched dot regions) is low. The term "temperature" is abbreviated by TEM in the drawings. Since the region outside the boundary of the energized block $B_n$ belongs to the nonenergized block $B_{n+1}$ the temperature is low, and heat escapes. This phenomenon cannot be prevented and occurs when the block $B_n$ is turned off and the block $B_{n+1}$ is turned on. A temperature distribution shown in FIG. 2B is obtained. Therefore, a boundary region between two adjacent blocks cannot be sufficiently heated at the beginning and end of a heating cycle (FIG. 2C). The printed pixels are blanked at the boundary, thus resulting in white dots thereat. The white dots appear as a white line in an image along the feed direction of the recording paper. When an image such as a photograph is created, the white line results in a decisive disadvantage.

SUMMARY OF THE INVENTION

It is, therefore, an object of the present invention to provide an image recording apparatus wherein heating element dots are divided into a plurality of blocks which are time-divisionally driven to print one-line pixels without white lines.

The present inventor found that white lines were eliminated when the heating element dots were divided into a plurality of blocks such that boundary dots were commonly assigned to each two adjacent blocks.

In order to achieve the above object of the present invention, there is provided a line thermal head having a large number of heating element dots, wherein the heating element dots are divided into a plurality of blocks which are time-divisionally driven to print one-line pixels, and at least one common dot is present between each two adjacent blocks.

DESCRIPTION OF THE PREFERRED EMBODIMENTS

Figure 1:
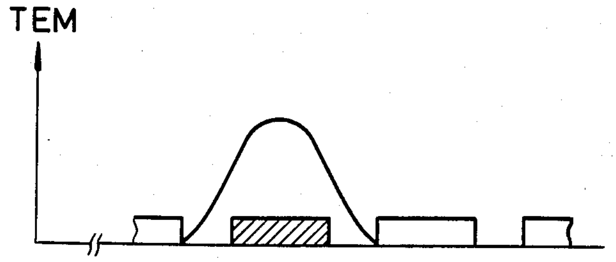
FIG. 1 PRIOR ART
FIGS. 1, 2A, 2B and 2C are respectively graphs showing temperature distributions of a conventional thermal head.
Figure 2A:
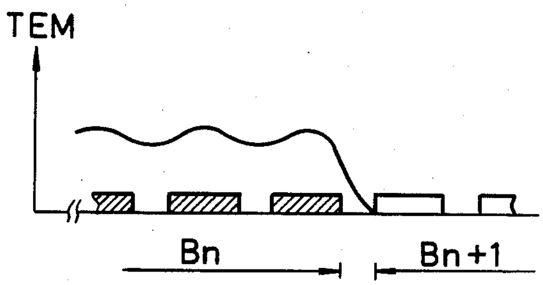
FIG. 2A PRIOR ART
Figure 2B:
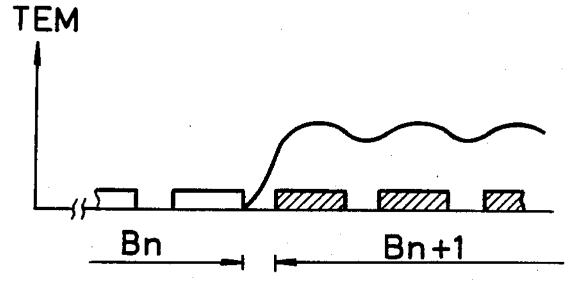
FIG. 2B PRIOR ART
Figure 2C:
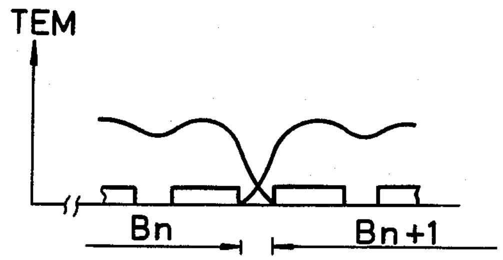
FIG. 2C PRIOR ART
Figure 3A:
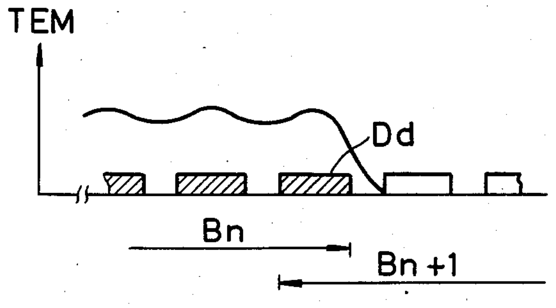
FIGS. 3A, 3B and 3C are respectively graphs showing temperature distributions so as to explain the principle of operation of a thermal head according to the present invention.
Figure 3B:
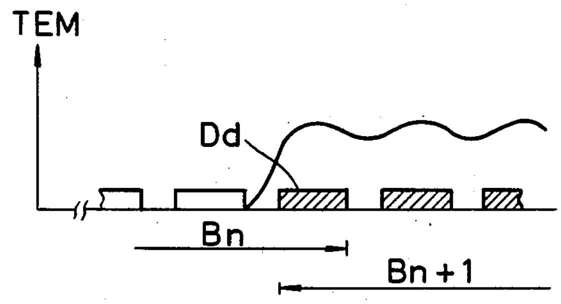
Figure 3C:
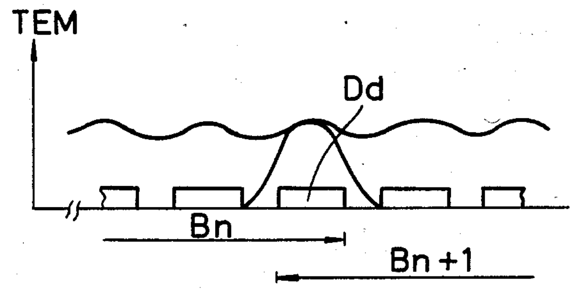

As shown in FIG. 3A, one dot Dd is commonly assigned to two blocks $B_n$ and $B_{n+1}$. The block $B_n$ is energized and heated, as shown in FIG. 3A. Subsequently, the blocks $B_n$ and $B_{n+1}$ are simultaneously deenergized and energized, respectively, as shown in FIG. 3B. In this state, the temperature of the boundary is decreased. The pixels of one horizontal line are uniformly printed. One horizontal line at the boundary will not be blanked, thus eliminating a white line.

However, the dot Dn commonly assigned to the blocks $B_n$ and $B_{n+1}$ is continuously heated and has a short lifetime as compared with dots belonging only to the blocks $B_n$ and $B_{n+1}$. The pixel corresponding to the common dot is printed twice and is thus emphasized. A black stripe (to be called as a black line hereinafter) tends to appear in the image.

In order to resolve these two problems, the present invention employs a dot drive scheme wherein the common dot Dd is changed randomly for each line, i.e., the block boundary position is changed randomly. This scheme solves the problem of shortened lifetime for one or more specific dots. In addition, emphasized pixels are scattered throughout the image to eliminate black lines.

According to the present invention, therefore, the block boundary position is prefereably changed randomly for each line.

Another solution can be proposed to resolve the two problems described above. Heat generated from the common dot can be reduced to substantially half that of the normal dot. Either a current supplied to a dot or an energization time or both can be reduced to half. However, the printing density of a pixel does not always correspond to heat generated from a corresponding dot. Therefore, the current or energization time must be larger or longer than $\frac{1}{2}$.

The present invention will be described in detail with reference to the preferred embodiments, but will not be limited thereto. For illustrative convenience, an electrical image signal is separated and provided as a monochrome image signal.

Figure 4:
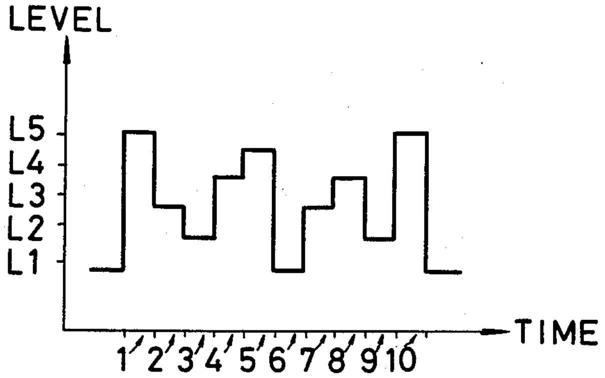
FIG. 4 is a graph showing a waveform of a one-line image signal in a thermal head according to a first embodiment of the present invention.

The electrical image signals are sequentially supplied in units of horizontal lines from the first line to the end line. A typical example of a one-line image signal is illustrated in FIG. 4. The image signal is divided into 10 time intervals along the time base. The intervals 1 to 10 correspond to heating element dots, respectively.

Gradation is expressed by an ON time of one heating element dot. By way of simplicity, there are six gradation levels 0, 1, 2, 3, 4 and 5, and 10 pixels for one horizontal line. A one-line image signal is sequentially compared with five comparison levels $L_1$, $L_2$, . . . and $L_5$ representing different densities. When the image signal is equal to or higher than a given comparison level, the signal is set at level "1". Otherwise, the signal is set at level "0". The level data "0" and "1" are obtained for each comparison level, as shown in Table 1.

TABLE 1

| Comparison Level | Level Data | | | | | | | | | | Signal |
|---|---|---|---|---|---|---|---|---|---|---|---|
| $L_5$ | 1 | 0 | 0 | 0 | 0 | 0 | 0 | 0 | 0 | 1 | $LD_{15}$ |
| $L_4$ | 1 | 0 | 0 | 0 | 1 | 0 | 0 | 0 | 0 | 1 | $LD_{14}$ |
| $L_3$ | 1 | 0 | 0 | 1 | 1 | 0 | 0 | 1 | 0 | 1 | $LD_{13}$ |
| $L_2$ | 1 | 1 | 0 | 1 | 1 | 0 | 1 | 1 | 0 | 1 | $LD_{12}$ |
| $L_1$ | 1 | 1 | 1 | 1 | 1 | 0 | 1 | 1 | 1 | 1 | $LD_{11}$ |
| Time (t) | 1 | 2 | 3 | 4 | 5 | 6 | 7 | 8 | 9 | 10 | |

Note:
Level data "0" represents nonprinting, and level data "1" represents printing.

Figure 5:
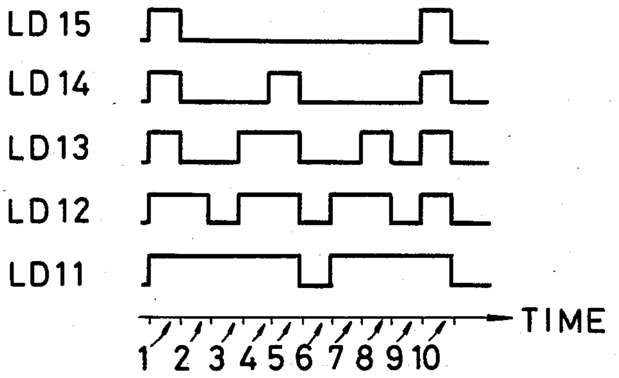
FIG. 5 is a timing chart of level data signals in the thermal head of the first embodiment.

The one-line image signal density is sequentially compared with the levels $L_1$ to $L_5$, and the resultant binary signals are given as $LD_{11}$, $LD_{12}$, $LD_{13}$, $LD_{14}$ and $LD_{15}$. The waveforms of these signals are respectively illustrated in FIG. 5.

Figure 6:
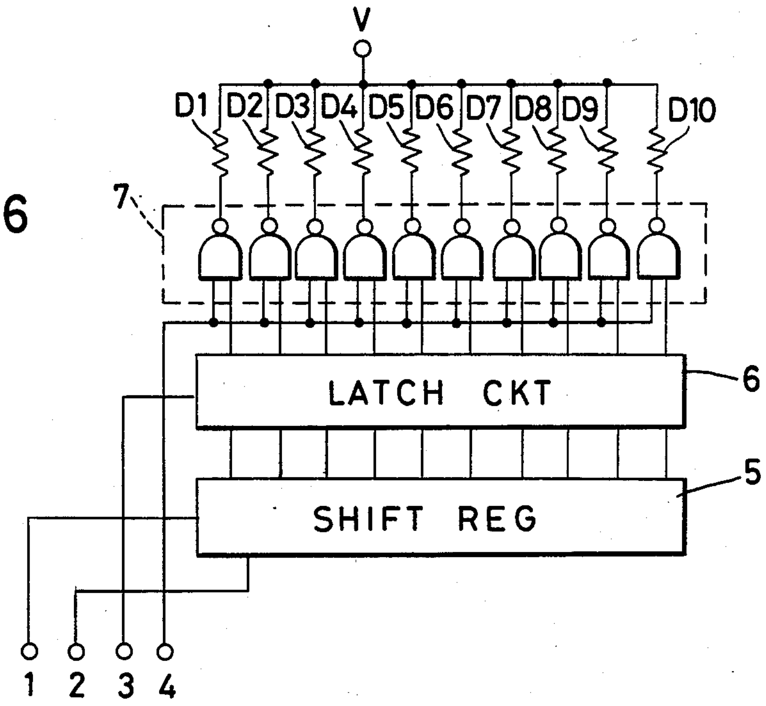
FIG. 6 is a circuit diagram of the thermal head of the first embodiment.

FIG. 6 shows an example of a thermal head TH used in an image recording apparatus according to a first embodiment. Heating element dots $D_1$, $D_2$, $D_3$, . . . and $D_{10}$ correspond to 10 pixels for one line. The thermal head has a terminal 1 for receiving a block level data signal (to be described later) a terminal 2 for receiving a clock timing signal, a terminal 3 for receiving a load signal, and a thermal head drive signal input terminal 4. The thermal head comprises a shift register 5, a latch circuit 6 and a NAND gate array 7 having 10 NAND gates.

The heating element dots $D_1$, $D_2$, . . . , and $D_{10}$ are divided into a first block $B_1$ consisting of the heating element dots $D_1$, $D_2$, . . . and $D_5$ and a second block $B_2$ consisting of the heating element dots $D_5$, $D_7$, . . . and $D_{10}$. In this case, the heating element dot $D_5$ is commonly assigned to both the first and second blocks $B_1$ and $B_2$. The number of dots in the first block $B_1$ is preferably equal to that in the second block $B_2$. During the first time interval, the first block $B_1$ is energized to perform printing. During the next interval, the first block $B_1$ is deenergized, and at the same time the second block $B_2$ is energized.

Figure 7:
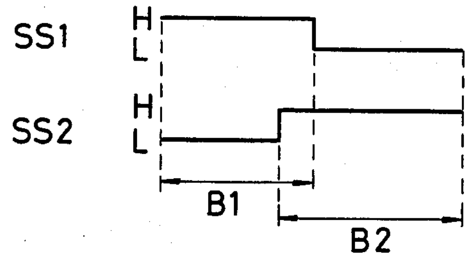
FIG. 7 is a timing chart of strobe signals of the first embodiment.

For this purpose, a strobe signal generator (to be described in detail later) generates two strobe signals SS1 and SS2 corresponding to the number of blocks, as shown in FIG. 7.

Figure 8A:
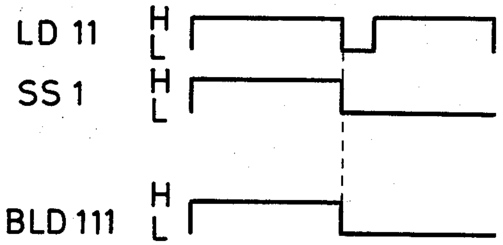
FIG. 8A and 8B are timing charts of block level data signals of the first embodiment.
Figure 8B:
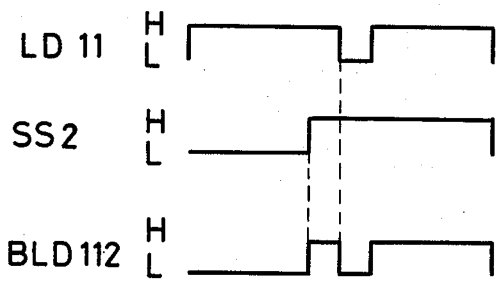

The level data signal $LD_{11}$ is multiplied by an AND gate (to be described later) with the strobe signals SS1 and SS2 to obtain block level data signals $BLD_{111}$ and $BLD_{112}$, as shown in FIGS. 8A and 8B.

The block level data signal $BLD_{111}$ is supplied to the terminal 1 of the thermal head shown in FIG. 6. The signal $BLD_{111}$ is supplied as a serial signal to the shift register 5 in response to a clock signal. The serial signal is transferred as a parallel signal to the latch circuit 6 in response to a load signal supplied from a sequence controller (to be described later) to the terminal (3).

An output from the latch circuit 6 is multiplied by the respective gates of the NAND gate array 7 with the drive signal from the sequence controller, so that a current flows in some of the dots $D_1$ to $D_5$ of the block $B_1$ which are designated by the block level data signal $BLD_{111}$. The designated dots are energized for a unit time Tu (Tu varies in accordance with the gradation level) and are heated. As a result, the pixels of gradation level 1 are printed on substantially half of one line on the imaging sheet. Nonprinted pixels are gradation level 0, i.e., they are left white.

The next level data signal $LD_{12}$ in place of the level data signal $LD_{11}$ is supplied to obtain block level data $BLD_{121}$ in response to the strobe signal SS1 in the same manner as described above, thereby performing pixel printing of gradation level 2. When printing of a given gradation level is changed to that of the next gradation level, a given heating element dot is often reenergized. In this case, time between the energization cycles is substantially zero or, if any, several nanoseconds. When the level data signal is supplied up to the highest level data signal $LD_{15}$, printing of pixels corresponding to the first line of the block $B_1$ is completed.

In order to perform printing by the block B2, the strobe signal SS1 is replaced by the strobe signal SS2. The level data signal $LD_{11}$ is processed to obtain block level data $BLD_{112}$ and the signal $BLD_{112}$ is supplied to the terminal 1. An output from the latch circuit 6 is multiplied by the respective gates of the NAND gate array 7 with the drive signal supplied to the terminal 4. Some of the dots $D_5$ to $D_{10}$ of the block $B_2$ which are designated by the data signal $BLD_{112}$ are energized for the unit time Tu. Therefore, pixels of gradation level 1 are printed on the second half of one line of the imaging sheet.

The level data signals $LD_{12}$, $LD_{13}$, $LD_{14}$ and $LD_{15}$ are sequentially processed in the same manner as described above, and pixels of the gradation level for the block $B_2$ are printed, thereby completing printing of the first line.

When the imaging sheet is fed for the next line, the next line image signal is printed on the corresponding line. When printing is completed up to the last line, a monochrome two-dimensional image having gradation levels is formed on the imaging sheet. In order to obtain a full-color image, yellow, magenta and cyan color signals, or yellow, magenta, cyan and black color signals are used to repeat the operation for monochrome image printing for each color. An additional circuit is added to the dot $D_5$ commonly assigned to the two blocks so as to decrease one or both of a current and an energization time for the dot $D_5$. Alternatively, the common dot may be shifted to prevent an excessive density of the pixels printed by the dot $D_5$ or reduce overloading of the dot $D_5$.

Figure 9:
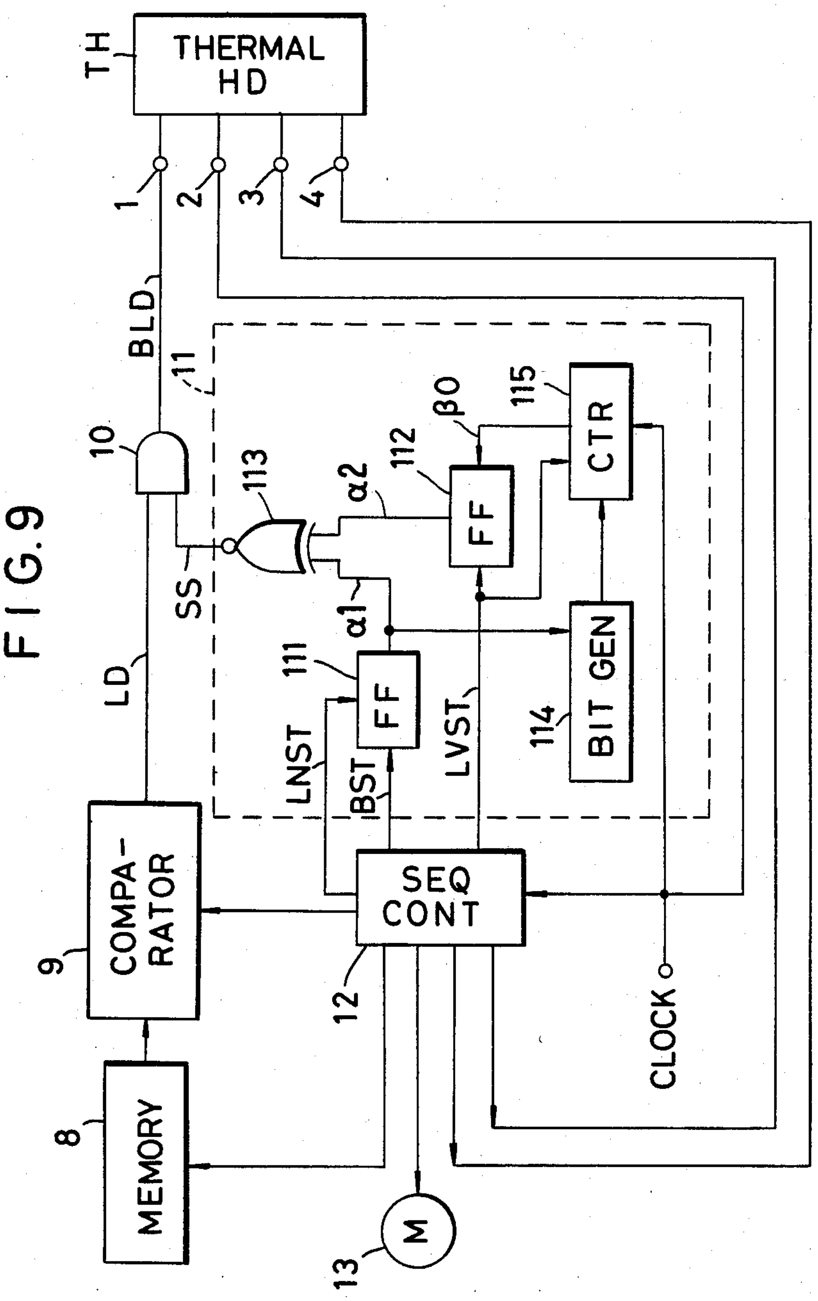
FIG. 9 is a block diagram of an image recording apparatus according to the first embodiment of the present invention.

Referring to FIG. 9 showing the image recording apparatus of the first embodiment, a sequence controller 12 controls the overall sequence of the apparatus. A one-line image signal designated by the controller 12 is read out from a memory 8 and is supplied to a comparator 9. The comparator 9 prestores the comparison levels $L_1$ to $L_5$. The controller 12 sequentially accesses the comparison levels $L_1$ to $L_5$ stored in the comparator 9. The comparator 9 compares the image signal with the level accessed by the controller 12.

The controller 12 repeatedly accesses for each block the image signal the number of times corresponding to the number of levels. An AND gate 10 receives the level data signal and a strobe signal and generates a block level data signal BLD as a logical product. A flip-flop 111 generates an identification signal $\alpha 1$ for identifying the block $B_1$ or $B_2$ under the control of the controller 12. The signal $\alpha 1$ is set at low level (corresponding to level "0" to be referred to as "L" hereinafter) when the signal $\alpha 1$ designates the block $B_1$. However, when the signal $\alpha 1$ designates the block $B_2$, it is set at high level (corresponding to level "1" to be referred to as "H" hereinafter). In this embodiment, the dot $D_5$ is given as the boundary dot. A bit generator 114 generates dot number "5" when the signal $\alpha 1$ is set at "L". However, when the signal $\alpha 1$ is set at "H", the bit generator 114 generates dot number "4". A presettable down counter 115 counts clock pulses to detect a sleeve signal waveform changing position represented by the bit number generated from the bit generator 114. One pulse of the clock signal corresponds to one pixel. A flip-flop 112 resets an output $\alpha 2$ thereof under the control of the controller 12 and sets the output $\alpha 2$ in response to a borrow signal when the counter 115 counts a predetermined number of clock pulses. An exclusive OR inverting gate 113 receives the output $\alpha 1$ from the flip-flop 111 and the output $\alpha 2$ from the flip-flop 112 and generates a strobe signal. The controller 12 supplies a load signal to the terminal 3 of the thermal head TH and a drive signal to the terminal 4. A motor 13 provides a relative displacement between the imaging sheet and the thermal head TH under the control of the sequence controller 12.

Figure 10A:
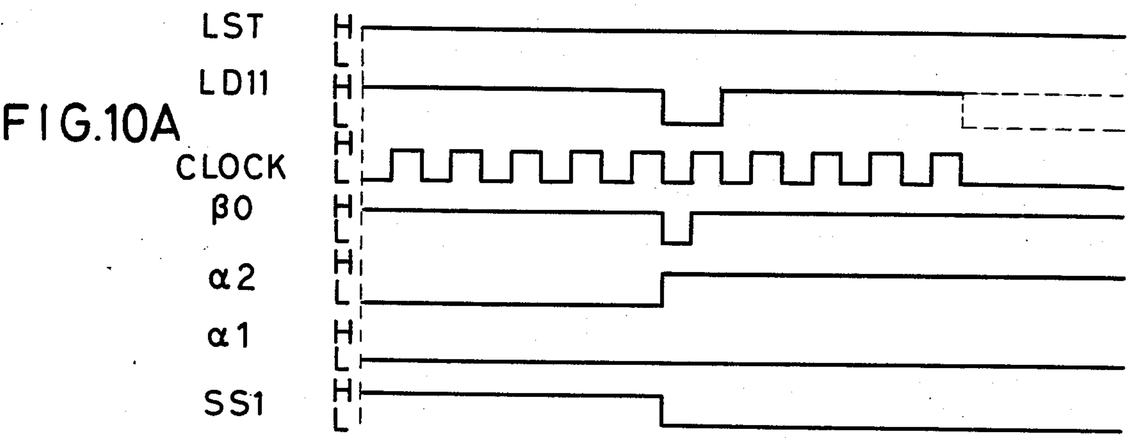
FIGS. 10A and 10B are respectively timing charts for explaining the operation of the image recording apparatus of the first embodiment.
Figure 10B:
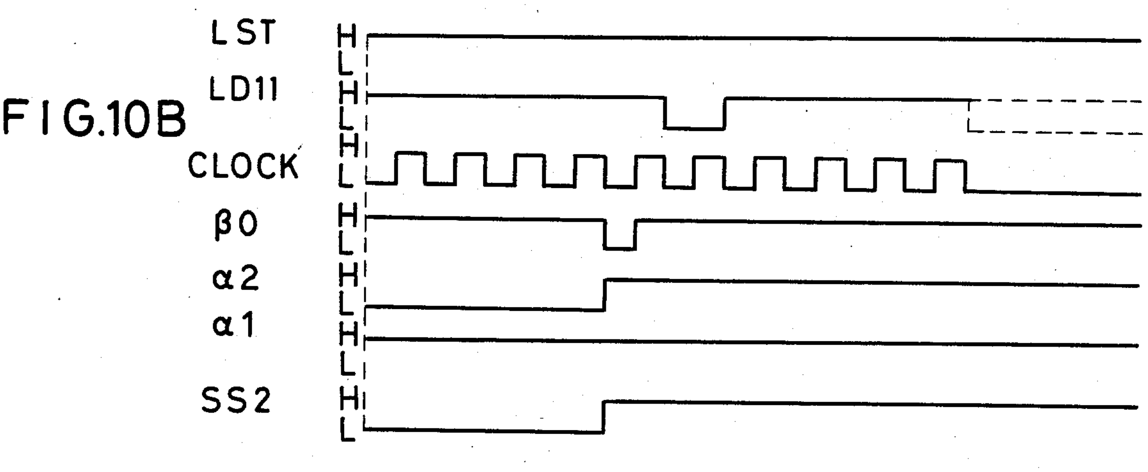

The controller 12 generates a pulsed line start signal LNST immediately before every line printing. The line start signal LNST initializes the flip-flop 111. In this case, the signal $\alpha 1$ is set at "H". A pulsed block start signal BST is generated from the controller 12 immediately before every printing of the block $B_1$. The flip-flop 111 performs toggling, and the signal $\alpha 1$ is set at "L". The controller 12 sequentially supplies a pulsed level start signal LVST to the flip-flop 112 every time the level in the comparator 9 is designated. The flip-flop 112 is reset in response to the level start signal LVST, and the output $\alpha 2$ is set at "L". At the same time, the output value "5" from the bit generator 114 is set in the counter 115. The level data signal $LD_{11}$ is supplied to one input terminal of the AND gate 10 in synchronism with a clock signal C. The counter 115 counts down the clock signal C. When the counter 115 counts the fifth clock pulse, it generates a borrow signal B0, thereby setting the flip-flop 112. Therefore, the output $\alpha 2$ is set at "H". Thereafter, the output $\alpha 2$ is kept "H" until the first level data signal $LD_{11}$ is completely sent. In this case, the output from the exclusive OR inverting gate 113 has a waveform of the signal SS1 set at "H" during the data period of the first to fifth dots of the level data signal $LD_{11}$ synchronized with the clock and at "L" during the data period of the sixth to tenth dots thereof. The timing chart of printing time of the first level is illustrated in FIG. 10A. The same operation as in the first level can be performed for the second to fifth levels, except that only the level data signal $LD_{11}$ is replaced with the level data signals $LD_{12}$ to $LD_{15}$. In printing by the block $B_2$, as shown in the timing chart of FIG. 10B, the controller 12 generates the block start signal BST immediately before printing for the block $B_2$. The flip-flop 111 inverts the output $\alpha 1$ therefrom to "H". Since the signal $\alpha 1$ is set at "H", the value "4" is supplied from the bit generator 114 to the counter 115. The level data signals $LD_{11}$ to $LD_{15}$ are sequentially supplied to one input terminal of the AND gate 10, and the same operation as in the block $B_1$ is repeated. The borrow signal is generated when the counter 115 counts five clock pulses for the block $B_1$. However, for the block $B_2$, the borrow signal is generated when the counter 115 counts four clock pulses. For the block $B_2$, since the signal $\alpha 1$ is set at "H", the strobe signal has a waveform of SS2, as shown in FIG. 10B. Printing operations by the blocks $B_1$ and $B_2$ are alternately repeated in units of horizontal lines. The controller 12 comprises flip-flops or a microcomputer so as to generate the above signals at predetermined timings.

In the first embodiment, the common dot is predetermined as the dot $D_5$ when the heating element dots are divided into two blocks $B_1$ and $B_2$. However, the pixel corresponding to the dot $D_5$ is printed twice and tends to be emphasized, resulting in a black line which is less apparent than the white line. In this case, the dot $D_5$ is used twice as compared with the dots belonging only to the blocks $B_1$ and $B_2$. The lifetime of the dot $D_5$ is shortened. As a result, the lifetime of the thermal head as a whole is shortened.

According to a second embodiment, the common dot is shifted randomly for each line.

Figure 11A:
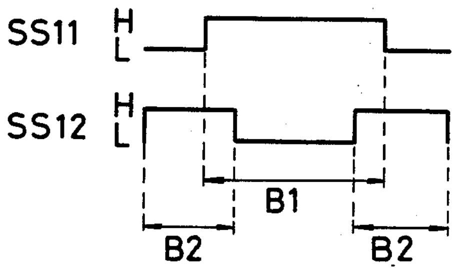
FIGS. 11A and 11B are respectively timing charts of strobe signals in an image recording apparatus according to a second embodiment of the present invention.

Unlike the first embodiment, the strobe signals comprise signals $SS_{11}$ and $SS_{12}$, as shown in FIG. 11A. The heating dots are divided into a first block $B_1$ consisting of the dots $D_3$ to $D_8$ and a second block $B_2$ consisting of the dots $D_1$ to $D_3$ and $D_8$ to $D_{10}$ In this case, two boundaries are formed. The common dots are the dots $D_3$ and $D_8$. A maximum of 6 pixels can be printed by the first half of one line, and a maximum of 6 pixels can also be printed by the second half of one line.

Figure 11B:
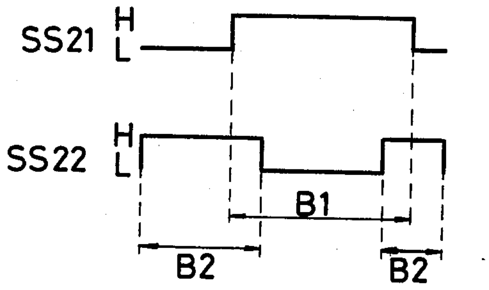

For the second line, independently of the first line, the strobe signals are updated to signals $S_{21}$ and $S_{22}$, as shown in FIG. 11B. In order to update the strobe signals randomly, a random signal is supplied from a random bit generator (to be described later) to a strobe signal generator (to be described later).

The signals are processed in the same manner as in the first embodiment, and printing is performed. The positions of dots commonly assigned to the two blocks are changed randomly. The emphasized pixels are scattered randomly throughout the two-dimensional image and are averaged. Since the dots are equally used, the lifetime of the thermal head will not be shortened.

Figure 12:
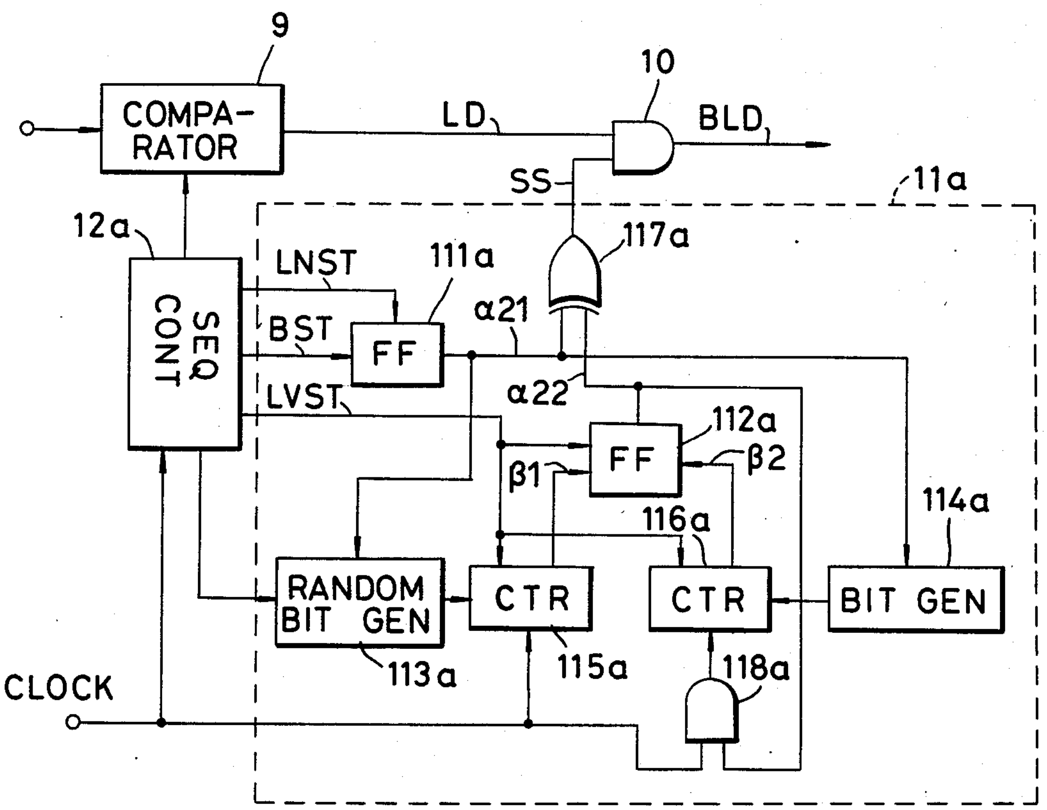
FIG. 12 is a block diagram of the image recording apparatus according to the second embodiment of the present invention.

FIG. 12 is a block diagram of a strobe signal generator 11*a* according to the second embodiment of the present invention. A memory 8, a motor 13 and a thermal head TH are omitted. The number of pixels for one line is given as M in the second embodiment, so that the thermal head has M heating element dots.

A flip-flop 111*a* is initialized in response to a line start signal LNST from a controller 12*a*, so that an output $\alpha$21 from the flip-flop 111*a* is set at "H". Toggling is performed by a block start signal BST from the controller 12*a*. A flip-flop 112*a* is initialized in response to the level start signal LVST generated from the controller 12*a* before the level data signal is generated for each level. An output $\alpha$22 from the flip-flop 112*a* is set at "L". The output $\alpha$22 is set at "H" in response to a borrow signal $\beta$1 from a counter 115*a*. The output $\alpha$22 is set at "L" in response to the borrow signal $\beta$2 from the counter 116*a*. A random bit generator 113*a* determines a given random number immediately before line printing and keeps the given random number during printing of the corresponding line. The random bit generator 113*a* supplies the value "l" to the counter 115*a* when the output $\alpha$21 from the flip-flop 111*a* is set at "L". However, the random bit generator 113*a* supplies a value "l+1" to the counter 115*a* when the output $\alpha$21 is set at "H". A bit generator 114*a* supplies a value "(M/2)+1" to a counter 116*a* when the output $\alpha$21 is set at "L". However, when the output $\alpha$21 is set at "H", the bit generator 114*a* supplies a value "(M/2)−1" to the counter 116*a*. The presettable down counter 115*a* presets the output value from the random bit generator 113*a* in response to the line start signal LNST. When the counter 115*a* counts the random bit value, it generates the borrow signal $\beta$1. The random bit generator 113*a* comprises a RAM storing bits accessed at random. The presettable down counter 116*a* presets the output value from the bit generator 114*a*. When a count of the counter 116*a* reaches this output value, it generates a borrow signal $\beta$2. The strobe signal generator 11*a* also comprises an exclusive OR gate 117*a* and an AND gate 118*a*.

In operation, the strobe signal comprises a repetition signal $SS_1$ for each level during printing for the block $B_1$. During printing for the block $B_2$, a signal $SS_2$ having a waveform different from that of the signal $SS_1$ is repeated for each level. The waveform of the strobe signal in a given level for each block will be described.

Figure 13A:
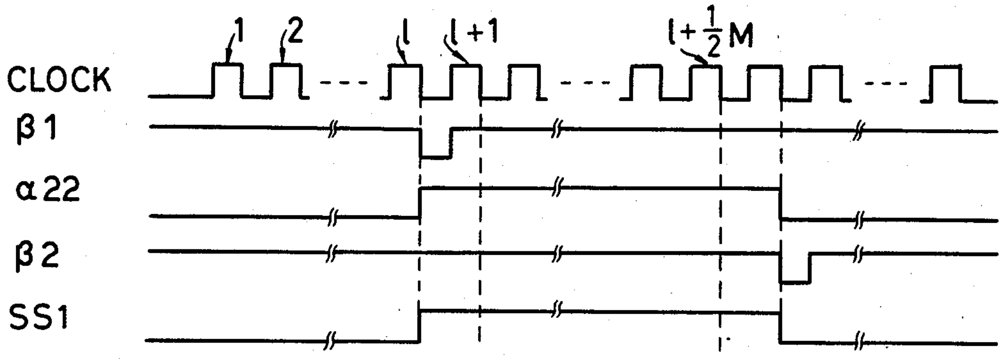
FIGS. 13A and 13B and respectively timing charts for explaining the operation of the image recording apparatus of the second embodiment.
Figure 13B:
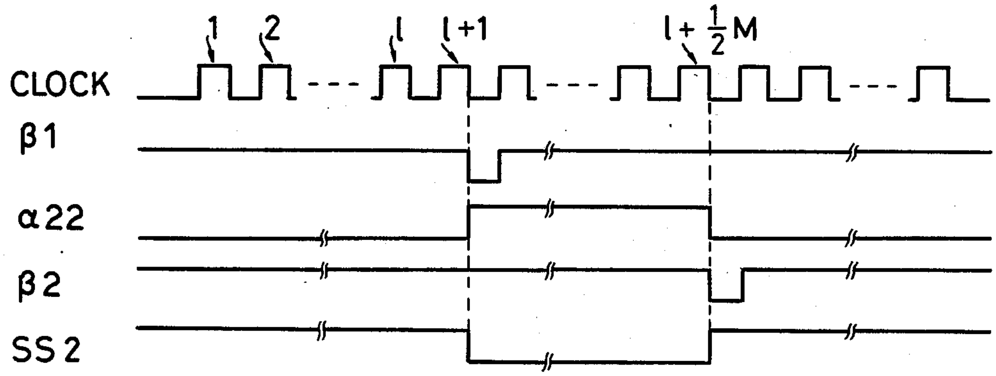

The random bit generator 113*a* generates the given value "l" before one-line printing is started. During printing by the block $B_1$, the output $\alpha$21 from the flip-flop 111*a* is set at "L". The output $\alpha$22 from the flip-flop 112*a* is set at "L" in response to the level start signal LVST. The initial value "l" and the initial value "(M/2)+1" are preset in the counters 115*a* and 116*a*, respectively. When the level data signal is supplied to one input terminal of an AND gate 10 in synchronism with the clock signal C, the counter 115*a* starts counting down the clocks. In this case, the counter 116*a* has not started counting since the output $\alpha$22 is set at "L". When a count of the counter 115*a* exceeds the preset value "l", it generates the borrow signal $\beta$1 to set the output $\alpha$22 from the flip-flop 112*a* to be "H". When the output $\alpha$22 is set at "H", the counter 116*a* starts counting up to the preset value (M/2)+1. When a count of the counter 116*a* exceeds the preset value, it generates the borrow signal $\beta$2 to set the output from the flip-flop 112*a* to "L". The above operation is shown in the timing chart of FIG. 13A, thereby obtaining the strobe signal SS1 for the block $B_1$. Subsequently, as shown in the timing chart of FIG. 13B, the strobe signal for the block $B_2$ is obtained in response to the block start signal BST in the same manner as in the first embodiment, except that the output $\alpha$21 is set at "H", the initial value of the counter 115*a* is l+1 and the initial value of the counter 116*a* is (M/2)−1.

A thermal head used in an image recording apparatus of a third embodiment has M (even number) heating element dots which are divided into blocks $B_1$ and $B_1$ each having (M/2)+1 dots. Two common dots are assigned to the blocks $B_1$ and $B_2$ in the same manner as in the second embodiment. In addition, the thermal head is controlled to stop employing the common dots during gradation printing for each of a plurality of levels so as to prevent emphasis of the pixel corresponding to the common dot.

For this reason, two strobe signals are required for each block printing. The first strobe signal is used for the first half of each gradation level, and the second strobe signal is used for the second half of the gradation level. One strobe signal has a pulse width shorter by a common dot(s) than that of the other strobe signal. In the third embodiment, the comparison levels include comparison levels $L_1$ to $L_p$.

Figure 14:
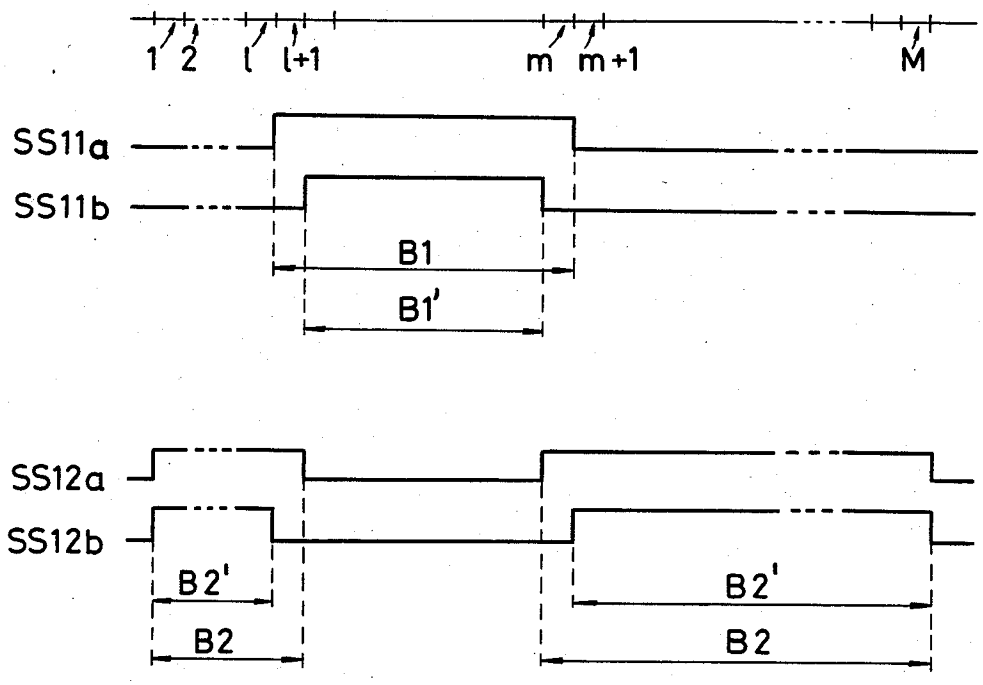
FIG. 14 is a timing chart of strobe signals in an image recording apparatus according to a third embodiment of the present invention.

FIG. 14 shows the two strobe signals for one line. A strobe signal $SS_{11a}$ is used for printing pixels of the first half of a given gradation level of the first line by the block $B_1$. A strobe signal $SS_{11b}$ is used for printing pixels of the second half of gradation level of the first line by the block $B_1'$. Similarly, a strobe signal $SS_{12a}$ is used for printing pixels of the first half of the gradation level of the first line by the block $B_2$, and a strobe signal $SS_{12b}$ is used for printing pixels of the second half of the gradation level of the first line by the block $B_2'$.

Figure 15:
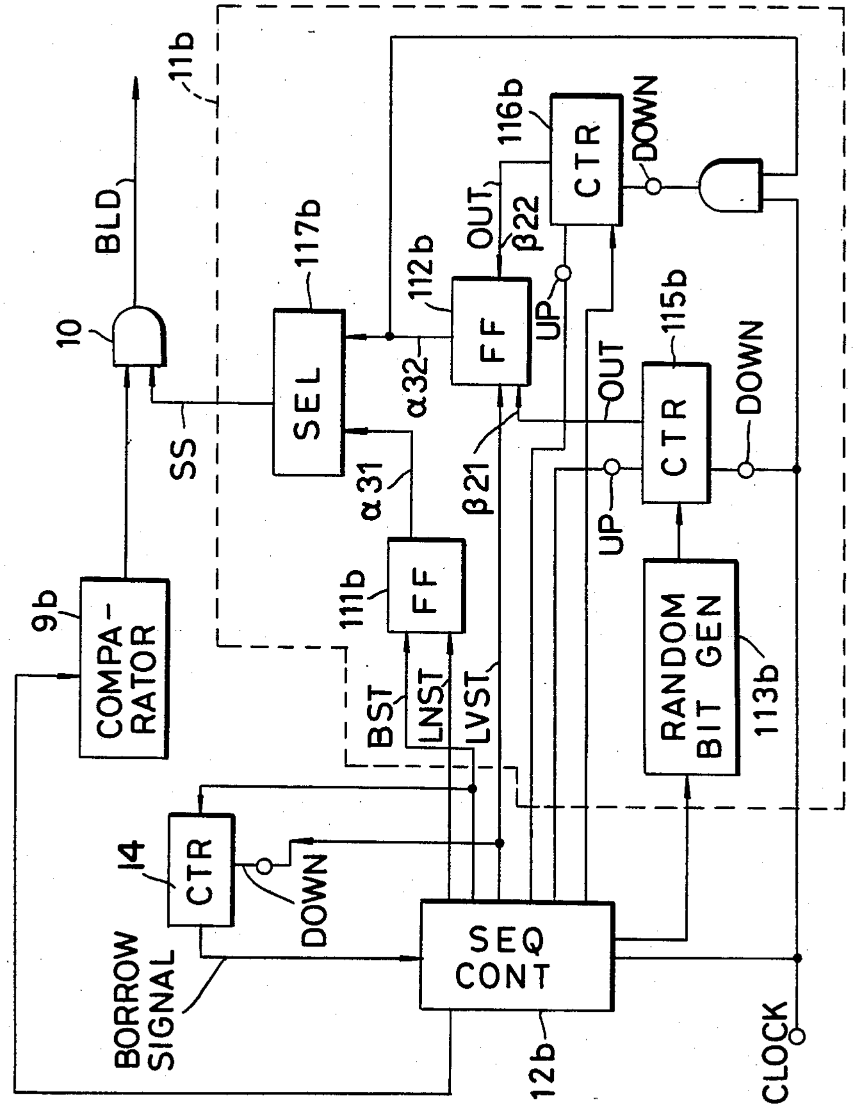
FIG. 15 is a block diagram of the image recording apparatus of the third embodiment.

A data strobe signal generator 11*b* shown in FIG. 15 generates the strobe signals $SS_{11a}$ and $SS_{11b}$ for causing blocks $B_1$ and $B_1'$ to perform printing for the first line and the strobe signals $SS_{12a}$ and $SS_{12b}$ for causing blocks $B_2$ and $B_2'$ to perform printing for the first line. Waveforms of these signals are changed randomly for each line. The strobe signal $SS_{11a}$ is supplied for the level data signals $LD_1$ to $LD_q$ to an AND gate 10 to perform printing by the block $B_1$.

Printing is performed in the same manner as in the previous embodiments in response to each level data signal from the signal $LD_1$ to the signal $LD_{1q}$. Thereafter, following the signal $LD_{1q+1}'$ the strobe signal $SS_{11b}$ instead of the strobe signal $SS_{11a}$ is used for the level data signal so as to perform printing by the block $B_1'$.

When the level data signal is supplied up to the signal $LD_{1p}'$ the pixels corresponding to the blocks $B_1$ and $B_1'$ are completely printed.

The lowest level data signal $LD_{11}$ is supplied again to one terminal of the AND gate 10. The strobe signal $SS_{12a}$ is supplied to the other input terminal of the block $B_2$ so as to drive the block $B_2$.

Printing is repeated in accordance with the subsequent level data $LD_{12}$ to $LD_{1q}$, so that the pixels of a gradation level up to the gradation level q are printed.

Pixels corresponding to the common dots $D_{l+1}$ and $D_m$ of the blocks $B_1$ and $B_2$ have thus been subjected to printing 2q number of times. When a parameter q is properly selected, the pixel density can be equal to the highest gradation level p. As a result, the common dots $D_{l+1}$ and $D_m$ need not be used for level data having a higher level than the (q+1) level.

For this reason, the strobe signal $SS_{12b}$ is used for the level data $LD_{1q+1}$.

Subsequently, when printing is repeated up to the highest level data $LD_{1p}$, pixels corresponding to the blocks $B_2$ and $B_2'$ are completely printed. As a result, pixels of the first line are printed. In this state, a sequence controller 12 supplies a signal to a motor 13 which is rotated to shift the imaging sheet and the heating element dots of the thermal head are aligned with the start position of the second line.

When strobe signals which are not related to the strobe signals $SS_{11a}$, $SS_{11b}$, $SS_{12a}$ and $SS_{12b}$ of the first line are used to process the second-line image signals, pixels for the second line can be printed.

FIG. 15 is a block diagram of a random strobe signal generator. The thermal head, the memory 8 and the motor 13 are omitted. A comparator 9*b* stores comparison levels $L_1$ to $L_p$ unlike the comparator of the first and second embodiments. A data selector 117*b* receives two inputs α31 and α32 and selects one of them. Flip-flops 111*b* and 112*b* have the same functions as the flip-flops 111*a* and 112*a* described previously. The output α31 from the flip-flop 111*b* is set at "L" when the block $B_1$ is driven. However, when the block $B_2$ is driven, the output α32 from the flip-flop 112*b* is set at "H". The output α32 from the flip-flop 112*b* is set at "H" in response to a borrow signal β21 from a counter 115*b*. The output α32 from the flip-flop 112*b* is set at "L" in response to a borrow signal β22 from a counter 116*b*. A random bit generator 113b supplies a value representing the number l of dots of the block $B_1$ of the first line to the counter 115*b* and maintains the value l for the printing time of the same line. The counters 115*b* and 116*b* comprise presettable up/down counters for counting down the preset values and generating the borrow signals β21 and β22.

A counter 14 counts the number of comparison levels and detects the qth gradation level. An output from the data selector 117*b* is set at "L" when the outputs α31 and α32 are both set at "L". The output from the data selector 117*b* is set at "H" when the signal α31 is set at "L" and the signal α32 is set at "H", or when the signal α31 is set at "H" and the signal α32 is set at "L". When the signals α31 and α32 are both set at "H", the output from the data selector 117*b* is set at "L". The data selector 117*b* can be replaced with an exclusive OR gate for receiving the signals α31 and α32.

Assume that printing is performed for the first line. The random bit generator 113*b* generates a given random number "l". During printing of the first line, the value "l" is kept constant. When the level data signals $LD_{11}$ to $LD_{1p}$ are sequentially supplied to the AND gate 10 in synchronism with the clock signal, the flip-flops 111*b* and 112*b* are cleared immediately before the level data signals $LD_{11}$ to $LD_{1p}$ are supplied in response to the clock signal. The random number "l" is set in the counter 115*b*, and the dot number (m−l), i.e., (M/2)+1 is set in the counter 116*b*. The parameter q is preset in the counter 14 in response to the block start signal BST and is decremented by one in response to each pulse of the level start signal LVST. When the count of the counter 14 reaches zero, it generates a borrow signal. When printing by the block $B_1$ is performed, the counter 14 generates the borrow signal. A pulse from the sequence controller 12*b* is supplied to the count up input terminal of the counter 115*b* before the next level data signal $LD_{q+1}$ is supplied, so that the preset value of the counter 115*b* is l+1. Two pulses are supplied from the controller 12*b* to the count down input terminal of the counter 116*b*, so that the preset value thereof is (M/2)−1.

The operation description will return to the beginning. The value "l" is preset in the counter 115*b* and the value (M/2)+1 is preset in the counter 116*b* before the level data signal $LD_{11}$ is supplied. When this level data signal is supplied, the counter 115*b* performs count-down operation in response to the clock signal. When the count of the counter 115 reaches zero, the flip-flop 112*b* is set. At the same time, the counter 116*b* performs count-down operation in response to the clock signal. When the count of the counter 116*b* reaches zero, the flip-flop 112*b* is reset, thereby generating the strobe signal $SS_{11a}$. The same operation as described above is repeated up to the highest level data signal $LD_{1q}$.

When the level data signal $LD_{1q}$ is processed, the counter 14 generates the borrow signal. In response to the borrow signal, the controller 12*b* supplies one pulse to the count up terminal of the counter 115*b* and two pulses to the count down terminal of the counter 116*b*. The counters 115*b* and 116*b* are preset to be l+1 and (M/2)−1, respectively. For this reason, after the level data signal $LD_{1q+1}$, the counter 115*b* counts down the value from l+1, and the counter 116*b* counts down the value from (M/2)−1. As a result, the strobe signal $SS_{11b}$ is generated. The same operation as described above is repeated until the level data $LP_{1p}$ is reached.

When the block $B_1'$ is completely driven, the block $B_2$ is initiated. One pulse is supplied from the controller 12*b* to the count up input terminal of the counter 115*b*, so that the preset value of the counter 115*b* is l+1. Two pulses are supplied from the controller 12*b* to the count down input terminal of the counter 116*b*, so that the preset value thereof is (M/2)−1. The output α31 from the flip-flop 111*b* is set at "H" to generate the strobe signal $SS_{12a}$ having an inverted waveform of the strobe signal $SS_{11b}$. The same operation as described above is repeated until the highest level data signal $LD_{1q}$ is reached.

When the level data signal $LD_{1q}$ is processed and the counter 14 generates the borrow signal, the block $B_2'$ is driven. In this case, the count up and down control signals are not supplied to the counters 115*b* and 116*b*, respectively. The preset values of the counters 115*b* and 116*b* are kept at l and M/2, respectively. For this reason, the strobe signal $SS_{12b}$ is generated. The same operation as described above is repeated until the highest level data signal $LD_{1p}$ is reached.

According to the third embodiment, the pixel corresponding to the dot commonly assigned to the blocks $B_1$ and $B_2$ is not printed twice. The density of this pixel is not higher than those of other pixels. The common dots are shifted randomly to completely eliminate black lines.

What is claimed is:

1. An apparatus for printing an image on an object, including:

(a) image signal generating means for repeatedly generating a one-line image signal a plurality of times;

(b) comparing means, having a plurality of comparison levels, for comparing the one-line image signal with one of said plurality of comparison levels and for generating a comparison signal, said comparing means being arranged to change the corparison levels every time the one-line image signal is generated;

(c) thermal head means having a plurality of heating elements one dimensionally, said plurality of heating elements generating heat upon energization and being driven to perform one-line image signal printing on said object;

(d) current supply means for supplying a current to said plurality of heating elements in response to the comparison signal, each of said plurality of heating elements being energized by said current from said current supply means;

(e) control means for controlling said current supply means such that current supply to said elements belonging to a first group and current supply to said elements belonging to a second group are inhibited at different times, said first group being constituted by at least some adjacent heating elements of said plurality of heating elements, said second group being constituted by heating elements of said plurality which are adjacent to said some adjacent heating elements at an interval of at least one of said plurality of heating elements, whereby said some adjacent heating elements are not included in said second group;

(f) detection signal generating means for detecting that said comparing means compares a predetermined comparison level of said plurality of comparison levels with the one-line image signal, and for generating a detection signal;

(g) means for inhibiting energization of said at least one heating element adjacent to said first group in response to the detection signal while current supply to said heating elements of said first group is inhibited under the control of said control means; and (h) means for inhibiting energization of said at least one heating element adjacent to said second group in response to the detection signal while current supply to said heating elements of said second group is inhibited under the control of said control means.

2. An apparatus according to claim 1, wherein said first group includes end heating elements of said plurality of heating elements aligned one dimensionally.

3. An apparatus according to claim 1, wherein said control means includes means for changing said heating elements constituting said first and second groups in response to completion of one-line image signal printing by said plurality of heating elements.

4. An apparatus according to claim 1, wherein said control means inhibits energization of said second group after energization of said first group is inhibited during one-line image signal printing by said plurality of heating elements.

5. An apparatus according to claim 1, wherein said second group comprises a predetermined number of heating elements among said plurality of heating elements.

6. An apparatus for printing an image on an object, including:

(a) thermal head means having a plurality of heating elements aligned one dimensionally, said plurality of heating elements generating heat upon energization;

(b) current supply means for supplying a current to said plurality of heating elements, each of said plurality of heating elements being energized by said current from said current supply means; and (c) control means for controlling said current supply means such that current supply to said elements belonging to a first group and current supply to said elements belonging to a second group are inhibited at different times, said first group being constituted by at least some adjacent heating elements of said plurality of heating elements, said second group being constituted by heating elements of said plurality which are adjacent to said some adjacent heating elements at an interval of at least one of said plurality of heating elements, whereby said some adjacent heating elements are not included in said second group.

7. An apparatus according to claim 6, wherein said apparatus further includes means for generating an image signal, and said control means controls said current supply means in response to the image signal.

8. An apparatus according to claim 7, wherein said plurality of heating elements correspond to a one-line image signal.

9. An apparatus according to claim 7, wherein said control means includes means for detecting a level distribution for each one-line image signal and generating a detection signal, and means for controlling energization times of said plurality of heating elements in response to the detection signal.

10. An apparatus according to claim 6, wherein said apparatus further includes means for changing said heating elements constituting said first and second groups in response to completion of one-line image signal printing by said plurality of heating elements.

11. An apparatus for printing an image on an object, including:

(a) image signal generating means for repeatedly generating a one-line image signal a plurality of times;

(b) comparing means, having a plurality of comparison levels, for comparing the one-line image signal with one of said plurality of comparison levels and for generating a binary signal, said comparing means being arranged to change the comparison level every time the one-line image signal is generated;

(c) thermal head means having a plurality of heating elements aligned one dimensionally, said plurality of heating elements generating heat upon energization and being driven to perform one-line image signal printing on said object;

(d) current supply means for supplying a current to said plurality of heating elements in response to the binary signal, each of said plurality of heating elements being energized by said current from said current supply means;

(e) first signal generating means for generating a first signal representing a first group constituted by some adjacent heating elements of said plurality of heating elements;

(f) second signal generating means for generating a second signal representing a second group constituted by some remaining adjacent heating elements and at least one of said plurality of heating elements, said at least one heating element being adjacent to said some remaining adjacent heating elements;

(g) control means for controlling said signal generating means such that the first and second signals are generated at different times; and (h) gate means for gating the binary signal to said current supply means, said gate means being operated such that the binary signal corresponding to heating elements excluded from said first group is inhibited from being supplied to said current supply means in response to the first signal, and so that the binary signal corresponding to heating elements excluded from said second group is inhibited from being supplied to said current supply means in response to second signal.

12. An apparatus for controlling a thermal head having a plurality of heating elements which are aligned one dimensionally and generated heat upon energization thereof, including:

(a) first means for energizing a first group constituted by some adjacent heating elements of said plurality of heating elements;

(b) second means for energizing a second group constituted by some remaining adjacent heating elements and at least one heating element of said first group, said at least one heating element being adjacent to said some remaining adjacent heating elements; and (c) control means for causing said first and second means to energize said first and second groups at different times.

* * * * *